June 9, 1942.   R. V. DERRAH   2,285,913
MODULATING CONTROL DEVICE
Filed Jan. 17, 1940    3 Sheets-Sheet 2

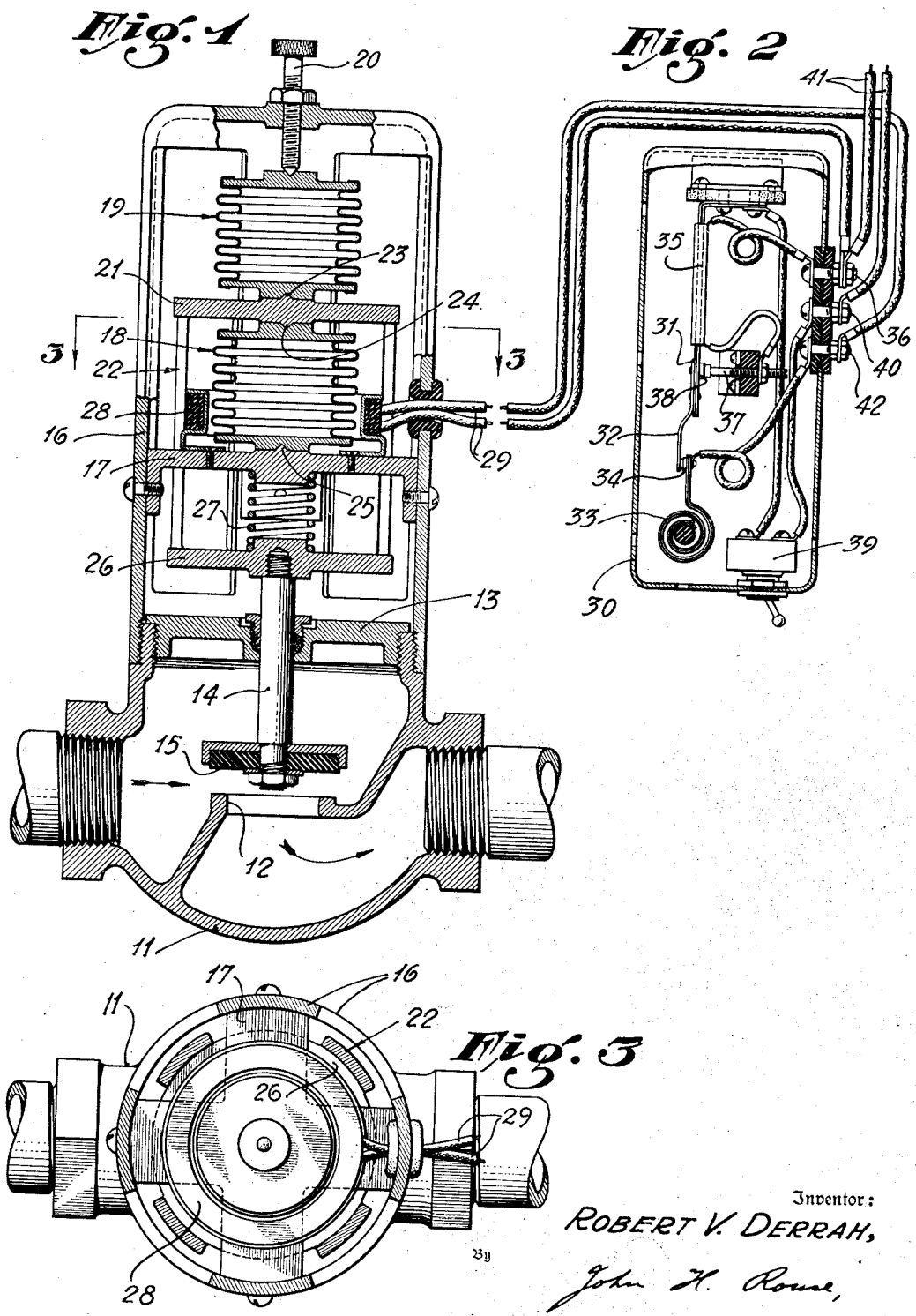

Inventor:
ROBERT V. DERRAH,
John H. Rouse,
Attorney.

June 9, 1942.  R. V. DERRAH  2,285,913
MODULATING CONTROL DEVICE
Filed Jan. 17, 1940  3 Sheets-Sheet 3
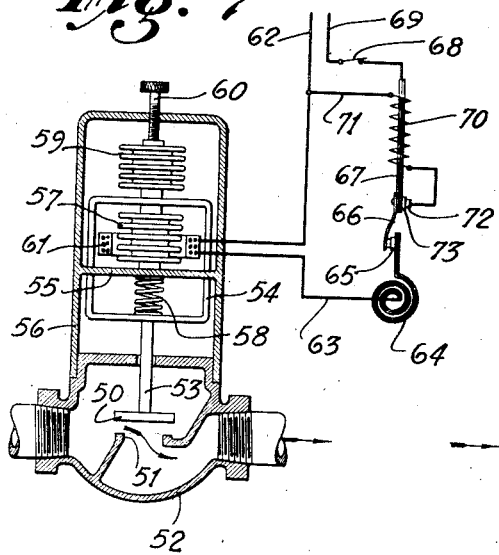
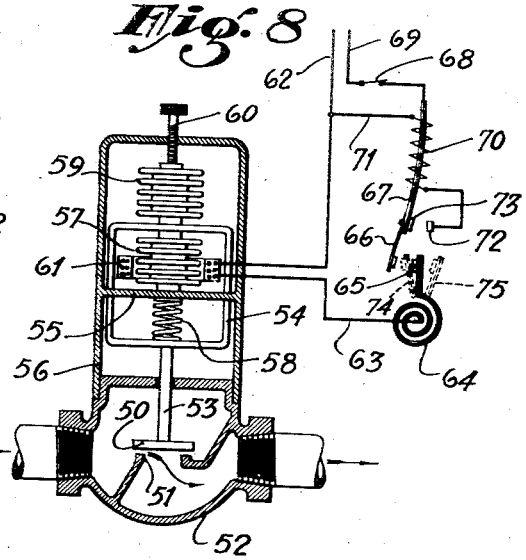
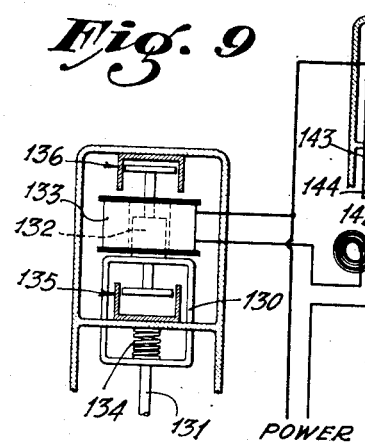
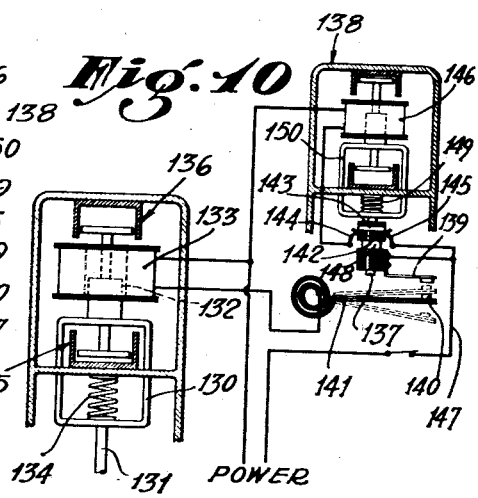
Inventor:
ROBERT V. DERRAH.
By John H. Rouse,
Attorney.

Patented June 9, 1942

2,285,913

UNITED STATES PATENT OFFICE 2,285,913

MODULATING CONTROL DEVICE

Robert V. Derrah, Beverly Hills, Calif.

Application January 17, 1940, Serial No. 314,291

4 Claims. (Cl. 236—68)

My present invention relates to electrical control apparatus and has for an object the provision of apparatus which, while not so limited, is particularly suitable for modulating or positioning control means for a condition changing device in accordance with the magnitude of the required change in said condition. Said condition may be, for example, one of temperature, humidity or pressure.

Another object of my invention is the provision of electrical switching means for periodically completing a circuit, the portion of the period during which the circuit is complete being variable.

Another object is the provision of means for periodically electrically energizing a condition changing control device, the portion of the period during which the device is energized being normally proportional to the difference between the desired and the then existing condition.

Another object is the provision of means for alternately moving an operating member in opposite directions, the movement of the member being so retarded in both directions that effective "positioning" of the member results.

Other objects and advantages of my invention will be found in the description, the drawings, and the appended claims.

For complete understanding of the invention, reference may be had to the following detailed description and accompanying drawings, wherein:

Figure 1 is a sectional view of an operating device embodying a feature of my invention;

Figure 2 is a sectional view of a thermostatic control device embodying my invention;

Figure 3 is a section taken along the line 3—3 of Fig. 1;

Figure 4:
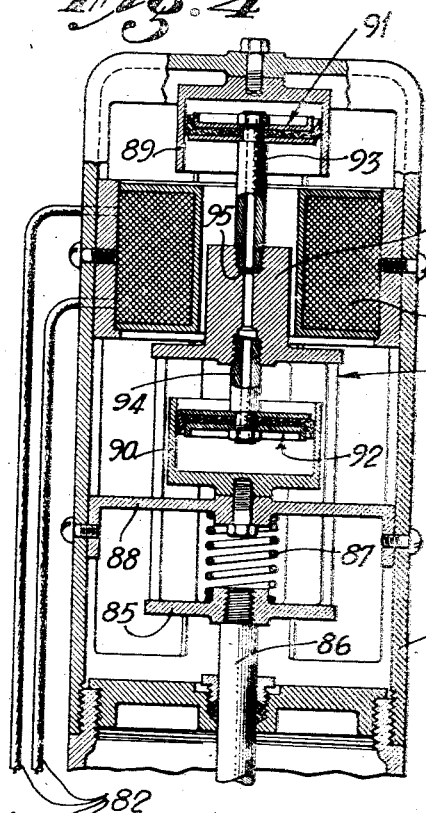
Figure 4 is a sectional view of a modified form of operating device embodying another feature of my invention.
Figure 6:
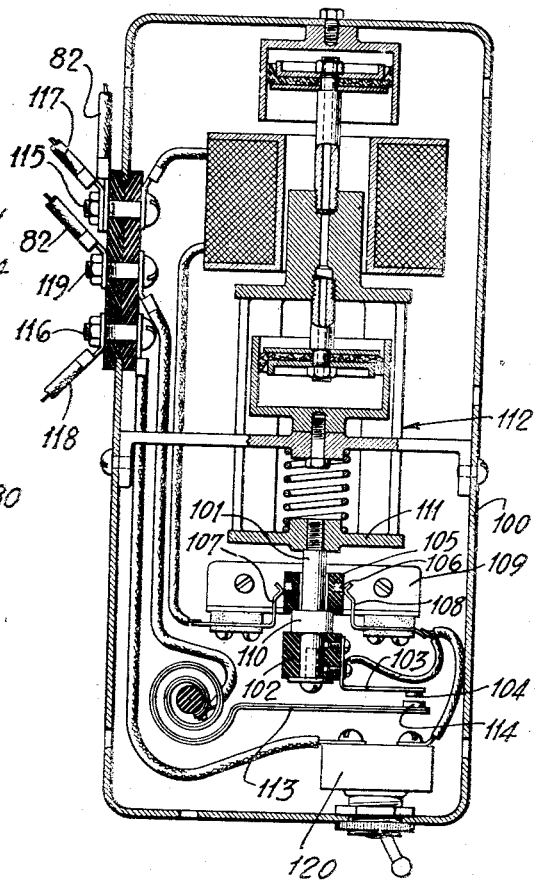
Figure 6 is an enlarged sectional view of the device shown in Fig. 5.
Figure 5:
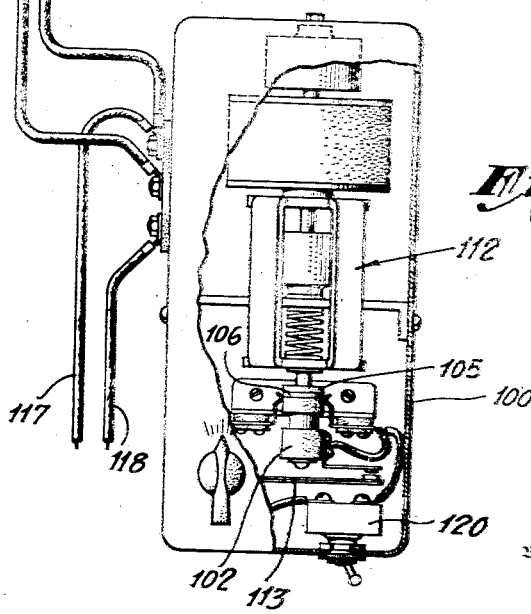
Figure 5 is a side elevation, with its cover partly broken away, of a modified form of thermostatic control device embodying my invention.

Each of Figures 7 and 8 is a diagrammatic view of the devices shown in Figs. 1 and 2; and Each of Figures 9 and 10 is a diagrammatic view of the devices shown in Figs. 4, 5 and 6.

Referring first to Figs. 1, 2 and 3 of the drawings, the numeral 11 indicates a valve casing having a partition provided with a fluid control port 12. Closing an opening in the upper portion of said valve casing is a threaded plate 13 having a central opening in which a valve stem 14 is slidable. Carried on the lower end of the valve stem and cooperable with the port 12 is a valve member 15.

Mounted on said upper portion of the valve casing is an apertured housing 16, secured to the side wall of which is a peripherally notched plate or bracket 17 supporting an expansible-contractible sealed vessel or bellows 18 containing a volatile fluid. Mounted on the top of said vessel, is a similar vessel 19, held in position by an adjusting screw 20 threaded in the top wall of the housing. Interposed between the two vessels is the top plate 21 of a yoke member 22. Projections 23 and 24, and 25, formed respectively on the plates 21 and 17, cooperate with depressions formed in the end walls of the vessels and serve to prevent lateral movement of the vessels and the yoke with respect to each other and to the housing. The upper end of the valve stem 14 is threaded in the bottom plate 26 of the yoke 22. A spring 27, compressed between the plates 17 and 26, urges the yoke downward and the valve member toward closed position. Mounted surrounding a lower portion of vessel 18 is an annular electrical heating coil 28 connected by wires 29 to a thermostatic control device shown in Fig. 2.

The device of Fig. 2 comprises a vented case 30, on the upper wall of which is insulatingly mounted a bimetallic member 31 carrying on its lower end a flexible contact arm 32. A helical bimetallic member 33, insulatingly and adjustably mounted on a wall of the case, carries on its upper end a contact element 34 cooperable with the arm 32. Surrounding a portion of member 31, and electrically insulated therefrom, is a heating coil 35 connected at its upper end to a terminal 36 and at its lower end to an insulated adjustable contact screw 37 cooperable with a contact element 38 carried by the bimetallic member 31. This member 31 is connected through a switch 39 to terminal 40. Terminals 36 and 40 are also connected to a source of current (not shown) by wires 41. It will thus be seen that, when switch 39 is closed, current can flow through the heating coil 35, contacts 37 and 38, and bimetallic member 31. This constitutes a conventional "flasher" system in which the heating of the member 31 functions to periodically move the member 31 in a clock-wise direction to open its heating coil circuit. In this periodic movement of member 31, the contact arm 32 is brought into and out of engagement with the contact 34 carried by the helical bimetallic member 33 and connected to terminal 42. This results in the closing and opening of the circuit through the heating coil 28 of the valve shown in Fig. 1, one of the lead wires 29 for the coil 28 being connected at terminal 36 directly to one of the supply wires 41, and the other of wires 29 being connected through terminal 42, contact 34, contact arm 32, member 31, switch 39 and terminal 40 to the other of the supply wires 41.

The operation of the system shown in Figs. 1–3 may better be understood by reference to the equivalent diagrammatic showing of Figs. 7 and 8. In these figures the numeral 50 indicates a valve member cooperable with a port 51 to control fluid flow through a valve casing 52. A stem 53 connects the valve member to a yoke 54, between the upper portion of which and a plate 55 fixed to a housing 56 is an expansible-contractible heat motor bellows or vessel 57. A spring 58 urges the yoke downward and the valve member toward closed position. A second expansible-contractible vessel 59 is held in engagement with the upper surface of the yoke by a screw 60 threaded in the upper wall of the housing. A heating coil 61 for the vessel 57 is connected by a wire 62 to a source of current (not shown), and by a wire 63 to a helical bimetallic member 64 carrying a contact element 65 cooperable with a flexible contact arm 66 secured to the lower end of a bimetallic member 67, the upper end of which is connected through a switch 68 to a wire 69 which is also connected to said source of current.

Surrounding a portion of member 67 is a heating coil 70, the upper end of which is connected to the source of current by a wire 71, and the lower end to a fixed contact element 72 cooperable with another contact element 73 secured to the lower end of member 67. This constitutes a conventional "flasher" system for periodically moving the member 67.

In Fig. 7, the contacts 65 and 66 are shown in engagement and the valve operator heating coil 61 is therefore energized, with the result that the vessel 57 is expanded to move the yoke and the valve member upward against the bias of spring 58 and unheated vessel 59. In Fig. 8, the member 67 is shown warped to its maximum extent, this member moving through a substantial arc after the separation of contacts 72 and 73 on account of the thermal lag of the system. With contacts 65 and 66 thus now open, heating coil 61 is unenergized and the valve tends to close. However, cooling of the vessel 57 is relatively slow and before the valve member is able to move downward through an appreciable distance, the member 67 will have cooled sufficiently to permit contacts 65 and 67 to again engage. The "flasher" system may be so arranged and adjusted that the member 67 completes its cycle in from 5 to 60 seconds, dependent on the degree of control desired.

When, by variation of temperature in the space wherein the thermostat is located, contact element 65, carried by the bimetallic member 64, moves farther into the path of travel of the contact element carried by contact arm 66, as shown in broken lines at 74 in Fig. 8, on account of the flexibility of members 64 and 66 the duration of engagement of the contacts will be greater than when the member 64 is in the original position shown in Fig. 7. When the member 64 assumes the position indicated in broken lines at 75, the contact 65 is removed from the path of travel of contact arm 66 and therefore no energization of heating coil 61 occurs. Although both of the members 64 and 66 have herein been shown and described as flexible, it is obvious that, for efficient operation of the system, it suffices that but one of these members be flexible.

It will thus be seen that the duration of energization of the heating coil 61 is dependent on the position of the contact element 65 in the path of travel of the contact carried by arm 66. Normally, the duration of energization is proportional to the difference between the existing temperature at the thermostat and the desired temperature for which the bimetallic member 64 has been set.

Assuming, for example, that the valve controls the supply of fuel to a heating system for the space wherein the thermostat is located, when the temperature in the space is low, the contact carried by the bimetallic member 64 will be in such position that it is continuously in engagement with the contact arm 66 throughout the cycle of movement of member 67. Consequently the heating coil 61 will be continuously energized with the result that the valve will assume a full-open position. When the temperature in the space now rises, say, to just below the temperature for which the thermostat is set, the member 64 will assume, for example, the position shown at 74 in Fig. 8, the heating coil 61 being energized during a major portion of the cycle so that the valve member will remain in an elevated position. If the temperature in the space continues to rise, say, to just above the temperature for which the thermostat is set, and the member 64 assumes the position shown in Fig. 7, the heating coil will be energized only during a small portion of the cycle and the valve member will assume a lower position, possibly fluctuating slightly upward and downward of that position if the rate of movement of member 67 is relatively slow. If, on further rise of temperature in the space, the member 64 assumes the position shown at 75 in Fig. 8, no energization of the heating coil will occur and the valve will therefore close.

In the prior art, systems have been disclosed wherein the positioning of a control device is accomplished by variation in the amount of a continuous flow of energizing current, as by a temperature controlled rheostat. By my present invention I accomplish the desired result by varying the duration of flow of current of a fixed value by periodical interruption so that the average energy imparted to the operating device is proportional to the position of the controlling member.

The function of the vessel 19 of Fig. 1 (or 59 in Figs. 7 and 8) is to compensate for changes in the ambient temperature adjacent the valve operator. Equal and opposed forces are thermally produced in both of the vessels 18 and 19 and consequently change in ambient temperature does not tend to move the operator.

Referring now to Figs. 4–6 of the drawings wherein is disclosed a modified control system embodying my present invention, the numeral 80 indicates an apertured operator housing, to the inner wall of which is secured a hollow coil member 81 electrically connected by wires 82 to a thermostatic control device shown in Fig. 5. Arranged to be attracted into said coil when the same is energized is the magnetic cylindrical upper end portion 83 of a yoke member 84. The lower end plate 85 of said yoke carries a stem 86 for the operation of a valve member, damper, or other means. A spring 87, compressed between said bottom end plate and a bracket 88 secured to the side wall of the housing, urges said yoke and stem downward. Secured respectively to the upper wall of housing 80 and to bracket 88 are opposed cup members 89 and 90, cooperable respectively with plungers or piston members 91 and 92. These plungers are carried by hollow rods 93 and 94, respectively, each threaded in the bore of the cylindrical upper portion 83 of yoke 84. These hollow rods permit fluid communication between the interior of the cup members 89 and 90, flow being restricted by an apertured disk 95, which may be replaced with a similar disk having an aperture of a different size if it is desired to vary the rate of fluid flow between the cup members.

In Figs. 5 and 6, each of which shows the same control device, the numeral 100 indicates a vented case wherein is mounted an electromagnetic operator essentially identical with that shown in Fig. 4. As this operator was fully described in the preceding paragraph, further description would be merely repetitious and is therefore deemed unnecessary.

Secured to the lower end of stem 101 of the operator is a collar 102, of insulating material, to which is fixed a flexible contact arm 103 carrying a contact element 104. Surrounding an upper portion of the stem 101, and slidable thereon, is an insulating collar 105 in the outer wall of which is recessed a metal contact ring 106. Cooperable with said ring are contact fingers 107 and 108, insulatingly supported by a bracket 109 mounted on a wall of the housing. Longitudinal movement of collar 105 with respect to the stem is limited by an enlarged lower portion 110 of stem 101 and by a central boss formed on the bottom plate 111 of yoke 112. The collar 105 is normally held stationary and "floating" on the stem by the force exerted on opposite sides of the collar by the fingers 107 and 108.

Insulatingly and adjustably mounted on a wall of the housing is a helical bimetallic member 113 carrying on its free end a contact element 114 cooperable with the contact element 104. Insulated terminals 115 and 116 are provided for the connection to the device, by wires 117 and 118, of a source of current (not shown). The upper lead of the operator coil is connected directly to the upper power terminal 115 and the lower lead to contact finger 107. The opposed contact finger 108 is connected through a switch 120 to the lower power terminal 116. It will be seen that when ring 106 is in such position as to interconnect the contact fingers 107 and 108, current can flow through the operator coil.

Also connected to the lower power terminal 116 through switch 120 is the contact arm 103. The inner end of bimetallic member 113 being connected to terminal 119, it will be seen that when contacts 104 and 114 are in engagement current can flow to coil 81, one lead of that coil being connected to the terminal 119 and the other lead directly to the upper power terminal 115.

When the coil 81 of the electromagnetic device shown in Figs. 4-6 is energized, the plunger 83 is attracted by the coil. However, its resultant upward movement is retarded by plungers 91 and 92 which, respectively, increase and decrease the fluid pressure in the cups 89 and 90, the fluid passing slowly from the one to the other through the restricted opening in disk 95. The fluid may normally be air, or, if slower movement is desired, it may be a liquid such as oil. When the coil 81 is deenergized, the operator is moved slowly downward by the force of spring 87, fluid now passing in the opposite direction between the cups.

The operation of the modified system shown in Figs. 4-6 may more readily be explained by reference to the equivalent diagrammatic showing of Figs. 9 and 10. Fundamentally, the operation is the same as that of the system disclosed in the other figures (Figs. 7 and 8) of the drawings. The operators and the control devices of the two systems are interchangeable; for example, the device shown in Fig. 2 may be employed to control the operator of Fig. 4, or the device of Figs. 5 and 6 to control the operator of Fig. 1.

In Figs. 9 and 10, a yoke 130 carries on its lower end an operating stem 131 and on its upper end a magnetic plunger 132 cooperable with a coil 133. The yoke 130 is downwardly biased by a spring 134 and is retarded in its upward and downward movement by fluidly intercommunicating dashpots 135 and 136. To the operating stem 137 of an electromagnetic device 138, substantially identical with that just described, is insulatingly secured a flexible contact arm 139. Cooperable with said contact arm is a contact element 140 carried by a bimetallic member 141. An insulating collar 142 having a bore freely fitting stem 137 is provided with a recessed contact ring 143 with which a pair of contact fingers 144 and 145 are cooperable. These fingers normally hold the collar stationary, so that the stem 137 can slide therein. As shown in Fig. 9, the contact fingers are in engagement with the opposite sides of the ring 143 so that the lower end of coil 146 is now connected to the source of power through the interconnected fingers 144 and 145 and wire 147. The upper end of coil 146 being directly connected to the power, the stem 137 is slowly moved upward, the collar remaining stationary until its lower end is engaged by the enlarged portion 148 of stem 137, when the ring is moved out of contact with the fingers, as shown in Fig. 10. The coil 146 now being deenergized, the stem 137 moves slowly downward under the force of spring 149, the collar again being held stationary until its upper end is engaged by the bottom portion of yoke 150, when the ring is again moved into contact with the fingers, as shown in Fig. 9, to initiate repetition of the cycle. It will be seen that the apparatus just described constitutes means for periodically moving the contact arm 139 in a manner similar to that of the "flasher" device shown in Figs. 2, 7 and 8.

When the arm 139 is brought into engagement with the contact element 140 it will be seen that the power circuit to coil 133 is completed. As was described in connection with Figs. 7 and 8, the duration of the engagement of contact arm 139 with contact element 140, and consequently the duration of energization of coil 133, is dependent on the respective position of contact element 140 in the path of travel of the contact arm, and the operator stem 131 is correspondingly positioned.

The system of my present invention may also be adapted to the control of an operator employing a reversible electric motor for its movement, by providing a pair of like condition-responsive contact-carrying devices, one at either end of the path of travel of the periodically moved contact carrying member so that but one of the thermally moved contacts is engageable thereby at any given temperature, engagement with one of the contacts effecting movement of the motor in one direction, and engagement with the other effecting movement of the motor in the opposite direction.

While I have herein shown and described, by way of illustration, specific embodiments of my invention, I wish it to be understood that modifications may be made therein without departing from the spirit of my invention. I intend, therefore, that my invention be limited only by the scope of the appended claims.

I claim as my invention:

1. In a system for adjusting the position of a member controlling the flow of fluid: a heat motor operatively connected to said member and including an expansible-contractible bellows having substantial volume and containing an expansible-contractible fluid, said heat motor also including an electric heater for supplying heat to said last-named fluid; and means determining the ratio of the periods of energization and deenergization of said heater, comprising a pair of relatively movable cooperating electrical contacts, means for cyclically varying the position of one of said contacts, means for urging the other contact toward said one of said contacts comprising means responsive to variations in a controlling condition for creating a force which varies in accordance with the departure of the degree of said condition from that desired, and a circuit for energizing said heater directly controlled by said contacts.

2. In a system for adjusting the position of a member controlling the flow of fluid: a heat motor operatively connected to said member and including a main expansible-contractible bellows having substantial volume and containing an expansible-contractible fluid, said heat motor also including an electric heater for supplying heat to said last-named fluid, said heat motor also having a compensating expansible-contractible bellows operating in reverse to said main bellows and subjected only to circumambient temperature; and means determining the ratio of the periods of energization and deenergization of said heater, comprising a pair of relatively movable cooperating electrical contacts, means for cyclically varying the position of one of said contacts, means operating in accordance with temperature variations for applying a force in accordance with said temperature variations for urging the other contact toward the said one of said contacts, and a circuit for energizing said heater directly controlled by said contacts.

3. In a system for adjusting the position of a member controlling the flow of fluid: a heat motor operatively connected to said member and including an expansible-contractible bellows having substantial volume and containing an expansible-contractible fluid, said heat motor also including an electric heater for supplying heat to said bellows and thereby to the fluid contained therein, said bellows, fluid and heater being so arranged that movement of said member due to energization or deenergization of said heater is relatively sluggish; and means determining the ratio of the periods of energization and deenergization of said heater, comprising a pair of relatively movable cooperating electrical contacts, means for cyclically varying the position of one of said contacts, means operating in accordance with temperature variations for applying a force in accordance with said temperature variations for urging the other contact toward the said one of said contacts, and a circuit for energizing said heater directly controlled by said contacts.

4. In a system for adjusting the position of a member controlling the flow of fluid: a heat motor operatively connected to said member and including a main expansible-contractible bellows having substantial volume and containing an expansible-contractible fluid, said heat motor also including an electric heater for supplying heat to said last-named fluid, said heat motor also having a compensating expansible-contractible bellows operating in reverse to said main bellows and subjected only to circumambient temperature; and means determining the ratio of the periods of energization and deenergization of said heater and thereby the position of said member, comprising a pair of relatively movable cooperating electrical contacts, means energized by the source provided for the energization of said heater for continuously moving one of said contacts in a fixed path, ambient temperature responsive means for moving the other of said contacts into said path so that it is engaged by the said one contact element in its movement, at least one of said contact-moving means being yieldable so that the duration of engagement of said contacts is dependent on the relative position of said second contact in the path, and a circuit for energizing said heater controlled by said contacts.

ROBERT V. DERRAH.